(12) United States Patent
Craig, Jr.

(10) Patent No.: US 7,653,972 B2
(45) Date of Patent: Feb. 2, 2010

(54) MECHANICAL CONNECTION FOR OPEN-TYPE HOSE CLAMPS

(76) Inventor: Paul M. Craig, Jr., 207 Quaint Acres Dr., Silver Spring, MD (US) 20904

( * ) Notice: Subject to any disclaimer, the term of this patent is extended or adjusted under 35 U.S.C. 154(b) by 398 days.

(21) Appl. No.: 11/648,767

(22) Filed: Jan. 3, 2007

(65) Prior Publication Data

US 2008/0155795 A1    Jul. 3, 2008

(51) Int. Cl.
*F16L 33/02* (2006.01)
(52) U.S. Cl. .................................................. 24/20 R
(58) Field of Classification Search ............... 24/20 R, 24/20 CW, 20 EE, 20 TT, 20 W
See application file for complete search history.

(56) References Cited

U.S. PATENT DOCUMENTS

| | | | | |
|---|---|---|---|---|
| 4,742,600 | A | * | 5/1988 | Calmettes et al. ............ 24/20 R |
| 4,991,266 | A | * | 2/1991 | Oetiker ........................ 24/20 R |
| 5,918,350 | A | * | 7/1999 | Detable et al. .............. 24/20 TT |
| 2003/0101544 | A1 | * | 6/2003 | Kitamura et al. .......... 24/20 CW |
| 2008/0155794 | A1 | * | 7/2008 | Craig ......................... 24/20 CW |

* cited by examiner

*Primary Examiner*—James R Brittain

(57) ABSTRACT

An open-type hose clamp which comprises a mechanical connection between overlapping inner and outer band portions, in which the mechanical connection includes at least one outwardly extending member extending outwardly from the inner band portion and adapted to engage in a corresponding aperture in the outer band portion, and in which the mechanical connection is such as to assure a lock up of the mechanical connection upon engagement of the outwardly extending member in the aperture and tightening of the clamp.

26 Claims, 2 Drawing Sheets

MECHANICAL CONNECTION FOR OPEN-TYPE HOSE CLAMPS

FIELD OF THE INVENTION

The present invention relates to an open-type hose clamp with a mechanical connection interconnecting overlapping band portions which includes a guide hook extending outwardly from the inner band portion and adapted to engage in a corresponding aperture in the outer band portion.

BACKGROUND OF THE INVENTION

Open-type hose clamps are known in the prior art which include one or more hook members extending outwardly from the inner band portion and adapted to engage in corresponding apertures in the outer band portion.

These prior art mechanical connections for open-type hose clamps usually include a rectangularly shaped hook member extending outwardly from the inner band portion into a rectangularly shaped aperture provided in the outer band portion as shown, for example, in U.S. Pat. No. 3,321,811 to Thomas. The hook members described above are usually bent out of the band material through an angle less than 90° to act as "guide" members by causing the overlapping band portion to be drawn inwardly toward the inner band portion during tightening of the clamp. Reopening of the mechanical connection of the clamp is likely when such guide members are bent to a 90° position and there beyond during tightening of the clamp.

The apertures in the outer band portion are thereby relatively long to permit movement of the guide hook members in the circumferential direction of the clamp and are much greater than the thickness of the clamping band material which normally consists of galvanized steel or stainless steel band material. Owing to the limited resistance of these hook members causing them to bend back during the tightening of the clamp, there always exists then the resulting danger of unwanted reopening of these open-type hose clamps during the installation of the clamp over the object to be fastened thereby.

There are two usual methods of installing these open-type hose clamps, that is, axially and radially over the object to be fastened thereby. To be able to install these open-type clamps axially, the mechanical connection interconnecting the overlapping band portions must stay closed, i.e., the hook member(s) constituting the mechanical connection must stay engaged in the aperture(s) of the mechanical connection. However, there is always the problem of inadvertent reopening as a result of bending back of the hook member(s), especially also during such axial installation because the clamps are made from flat steel band material and are normally predeformed into more-or-less circular shape, thereby leaving a residual stress in the thus predeformed band material which seeks to return to the prior flat shape. The prior art mechanical connections as used heretofore with the use of at least one of such guide hooks of the type described above provides no assurance against reopening.

When installing the clamp radially over the object to be fastened thereby, it is again necessary that the mechanical connection remain engaged during the entire tightening operation of the clamp. The prior art mechanical connections of the type described above do not provide the necessary assurance to remain engaged.

It is therefore an object of the present invention to provide a mechanical connection in the overlapping band portions of so-called open-type hose clamps which assures that the mechanical connection remains engaged from initial installation throughout the entire tightening operation of the clamp.

Another object of the present invention resides in a mechanical connection for open-type hose clamps which is simple, easy to manufacture and reliable in operation.

SUMMARY OF THE INVENTION

The present invention solves the aforementioned problems encountered with the mechanical connections described above by modifying both the guide hook member as also the aperture into which the hook member engages. More particularly, the aperture no longer consists of a simple rectangular aperture but, according to this invention, includes a substantially rectangular portion of greater width and limited length and a longer portion of reduced width connected with the wider portion by way of converging portions. In turn, the hook member is provided with cutouts of substantially rectangular shape extending inwardly from both lateral surfaces which are of such width and depth that the hook member can slide into the longer aperture portion of reduced width and at the same time positively locks the mechanical connection.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
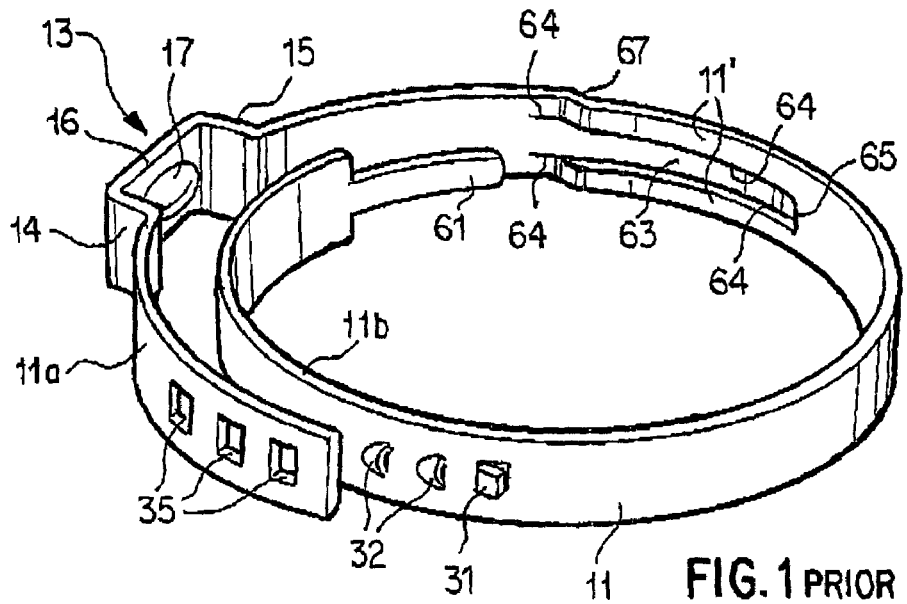
FIG. 1 is a perspective view on an enlarged scale of a prior art open-type hose clamp as disclosed in U.S. Pat. No. 4,299,012 whose prior art mechanical connection as shown in FIGS. 2 and 3 of this patent only needs to be modified in accordance with the present invention as shown in FIGS. 5-7 herein.

Referring now to the drawing, wherein like reference numerals are used throughout the various views to designate like parts, the prior art clamp of FIG. 1, as described in U.S. Pat. No. 4,299,012 includes a clamping band 11 with overlapping band portions 11*a* and 11*b* and with a plastically deformable ear generally designated by reference numeral 13 and known in the trade as "Oetiker" ear after the name of its inventor. The "Oetiker" ear is of generally hat-shaped configuration formed by leg members 14 and 15 interconnected by a bridging portion 16 that preferably includes a reinforcing means 17. To assure an internal clamping surface devoid of steps, gaps and discontinuities, especially at the end of the inner band portion 11b, the prior art clamp further includes a means to avoid such steps and discontinuities that includes a tongue-like extension 61 at the end of the inner band portion 11b adapted to extend through an opening provided in the step-like portion 67, all as more fully described in the U.S. Pat. No. 4,299,012. The mechanical connection of this prior art clamp, illustrated also in FIGS. 2-4 of this application, includes a rectangularly shaped guide hook member 31 extending outwardly from the inner band portion 11b and adapted to engage in a rectangular aperture 35 in the outer band portion 11a as more fully shown also in FIG. 4 of this patent.

Figure 2:
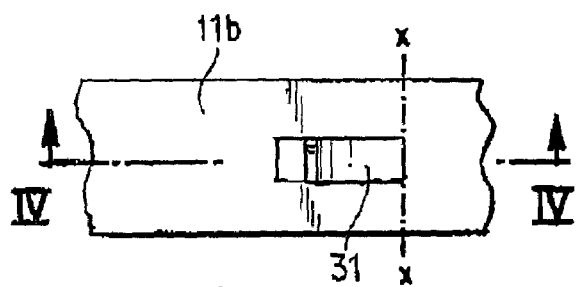
FIG. 2 is a partial, somewhat schematic plan view on an enlarged scale on the inner band portion of a prior art mechanical connection provided with a rectangular guide hook for the mechanical connection of the clamp.
Figure 3:
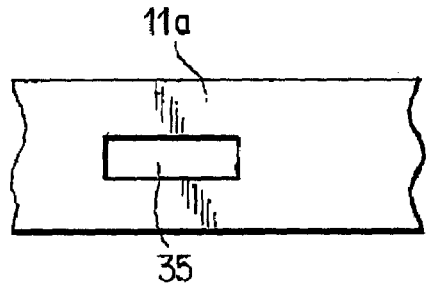
FIG. 3 is a somewhat schematic partial plan view on an enlarged scale on the outer band portion of a prior art mechanical connection provided with a rectangular aperture for the guide hook.
Figure 4:
FIG. 4 is a somewhat schematic cross-sectional view taken along line IV-IV of FIG. 2.

The prior art guide hook member 31 is thereby obtained by a cut in the clamping band material of the inner band portion 11b involving three sides of a rectangle as shown in FIGS. 2 and 3 herein to be bent outwardly about the axis x-x also shown in FIG. 2 herein through an angle less than 90°.

As the hook member 31 is extended through the aperture 35, the angle α of less than 90° normally prevents the outer band portion 11a from escaping outwardly owing to the residual stress which is left in the clamping band as a result of the predeformation into approximately circular shape. In other words, the outer clamping band portion 11a has an inherent tendency to return to its prior flat shape which would cause the mechanical connection to reopen in the absence of the particular position of the guide hook member 31 bent out through an angle less than 90°.

BRIEF DESCRIPTION OF THE INVENTION

Figure 5:
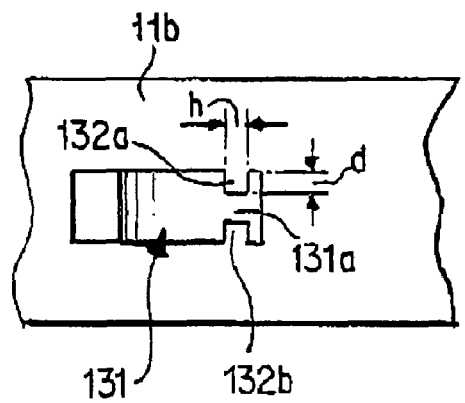
FIG. 5 is a somewhat schematic partial plan view, on an enlarged scale, similar to FIG. 2, on the guide member of the mechanical connection provided in the inner band portion in accordance with the present invention.
Figure 6:
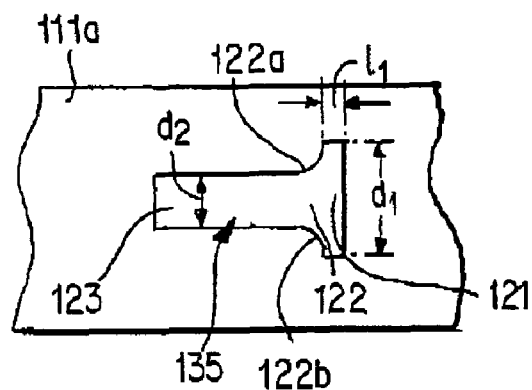
FIG. 6 is a somewhat schematic partial plan view, on an enlarged scale similar to FIG. 3, and illustrating the aperture for the guide hook in the mechanical connection according to the present invention.
Figure 7:
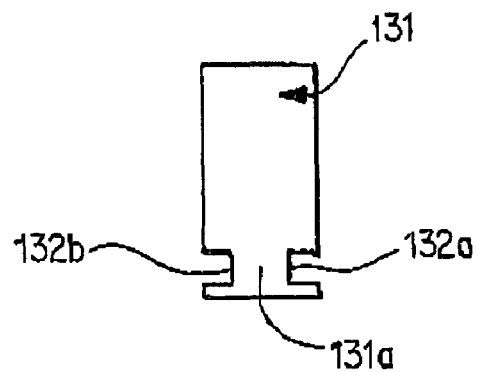
FIG. 7 is a somewhat schematic elevational view on an enlarged scale of the guide hook in accordance with the present invention.

According to the present invention, as illustrated in FIGS. 5-7 of this application, in which similar reference numerals of the 100 series are used, this is prevented in a simple, reliable manner by changing the prior art rectangular aperture 35 of FIG. 3 into a modified aperture generally designated by reference numeral 135 (FIG. 6) of more complex shape. The guide hook member generally designated by reference numeral 131 (FIGS. 5 and 7) is now also modified accordingly as will be described more fully hereinafter.

More specifically, the aperture 135 includes an aperture part 121 of a length $l_1$ width $d_1$ somewhat greater than the length and width of the hook member 131 to permit easy insertion thereof into the aperture part 121. The more or less rectangular aperture part 121 is adjoined by an aperture part 122 that gradually narrows in the longitudinal direction and is formed by converging surfaces 122a and 122b terminating in a relatively narrower and longer aperture part 123 of diameter $d_2$ and extending in the longitudinal direction of the clamping band. The aperture parts 121 and 123 are preferably of substantially rectangular shape while the converging portions 122a and 122b may be continuously curved or be linear preferably passing over into the aperture portions 121 and 123 by rounded-off curvatures of relatively small radius. The angle of convergence can be suitably chosen depending on the type and width of the band material, on the width of the hook member 131 which in turn depends to some extent on the width of the clamping band material. The converging surfaces 122a and 122b may thereby form an angle with the longitudinal direction of the clamping band material from about 55° to about 35°, preferably 50 to 40°. The length of the converging portions 122a and 122b as also all other dimensions of the hook member 131 and of the aperture 135 may also be empirically determined for optimal condition depending on the length of the aperture portion 123 which in turn depends on the width of the guide member 130 and the material used for the clamping band.

To achieve the lock-up condition of the mechanical connection, the guide member 130 is provided with two substantially rectangular cut-outs 132a and 132b in the area adjoining the axis x-x about which the guide member is bent out of the clamping band material, i.e., within the area to the left of the axis x-x of FIG. 2. The height h of the cut-outs 132a and 132b is thereby somewhat larger than the thickness of the clamping band material sufficient to permit easy sliding movement of the guide hook member 131 in the area of the aperture portion 123. The depth d of the cut-outs 132a and 132b must be correlated to the width $d_2$ of the aperture part 123. In each case, the depth d of these cut-outs 132a and 132b must be such that the remaining part 131a left in the hook member 131 is slightly smaller than the width $d_2$ of the aperture part 123 so that the guide member 130 can readily slide from the aperture part 121 into the aperture part 123. The depth d of the rectangular cut-outs 132a and 132b is such that the remaining reduced width portion 131a of the hook member 130 is not weakened excessively while the width of the cut-outs 132a and 132b must be sufficiently greater than the thickness of the clamping band material to allow free sliding movement of the hook member through the aperture part 123. Again, optimum dimensions can be readily determined empirically depending on type and size of the clamping band material. Typical values for the d depth of the cut-outs 132a and 132b are such that the width of the reduced width portion 131a is at least about 50% of the normal width of the hook member, preferably from about 50% to about 70%. The height h of the cutouts is preferably at least 1.15 times the thickness of the clamping band material.

Operation

The engagement of the mechanical connection in accordance with the present invention is quite simple and does not depart materially from what was done heretofore. All that is necessary is to engage the hook member 130 through the aperture portion 121 whereupon the residual stress in the clamp seeking to enlarge its diametric dimension is likely to normally cause the guide member 130 to slide toward the aperture portion 123. If necessary, this can be assisted by a slight pressure on the guide member 130 in this direction. Once the guide member 130 leaves the aperture portion 121 and reaches the aperture portion 123, the mechanical connection remains securely locked against reopening by engagement of the sides of the aperture portions 122a,122b, 123 engaging in cutouts 132a and 132b.

With clamps equipped with a plastically deformable, so-called "Oetiker" ear which is plastically deformed for tightening the clamp, the guide member 130 will move during contraction of the "Oetiker" ear until it reaches the end of the aperture portion 123 and will stay in such position during the remaining tightening and after completion of the tightening of the clamp.

The present invention thus assures a lock-up of the mechanical connection by extremely simple means that require no major changes in the manufacture of the clamp from clamping band material as only some cutting dies have to be changed.

While I have shown and described only one embodiment in accordance with the present invention, it is understood that the present invention is not limited to the embodiment illustrated but is equally applicable to all other types of open-type clamps which utilize a mechanical connection with a guide hook member of the type described above.

Additionally, it is also understood that the shape of the aperture 120 may be changed at will to suit particular needs by changing the length of the aperture parts 121 and 123 as also the effective length formed by the converging parts 122a and 122b and by changing the angle α.

The present invention is also applicable to mechanical connections in which the members extend inwardly from the outer band portion into apertures provided in the inner band portion.

The present invention is thus not limited to the embodiment illustrated but is applicable to other mechanical connections and may be varied to suit any particular need, and I therefore do not wish to be limited to the illustrated embodiment, but intend to cover all such changes and modifications as are encompassed by the scope of the appended claims.

What is claimed is:

1. An open-type hose clamp having overlapping band portions and a mechanical connection for said band portion including a hook member in one of said band portions operable to engage in an aperture in the other of said band portions, and means in said connection for positively locking up said connection against inadvertent reopening during tightening of said clamp, and wherein said means includes at least one cutout along one side of said hook member operable to engage with a lateral band portion defining said aperture and said at least one cutout is located in the area adjacent an inner end of said hook member.

2. An open-type hose clamp according to claim 1, in which said aperture includes a wider portion for initial engagement by the hook member and a narrower aperture portion for engagement with corresponding cutout portions near the area where the hook member is bent out of the inner band portion.

3. An open type hose clamp according to claim 2, wherein said wider portion and said narrower aperture portion are connected by way of converging portions.

4. An open-type hose clamp according to claim 3, wherein said converging portions pass over into the wider portion and into the narrower portion by way of rounded-off surface portions.

5. An open-type hose clamp according to claim 4, wherein the angle of said converging portions with the longitudinal direction of the clamping band is from about 30° to about 65°.

6. An open-type hose clamp according to claim 4, wherein said angle is between about 55° to about 35°.

7. An open-type hose clamp according to claim 3, wherein the angle of said converging portions with the longitudinal direction of the clamping band is from about 30° to about 65°.

8. A clamp comprising a clamping band forming overlapping inner and outer band portions in the installed condition, a mechanical connection between said overlapping band portions including a tab-like member extending outwardly from the inner band portion for engagement in at least one opening in the outer band portion, characterized by means including said tab-like hook member for preventing reopening of the connection during tightening of the clamp, said means further including a first opening in said outer band portion of a first width in the transverse direction and a second opening in communication with said first opening and of smaller width than said first opening, and said tab-like hook member being of a first width in the transverse direction of said tab-like member greater than the width of said second opening in the outer band portion, and in the area adjacent the inner end area thereof, being of a second reduced width smaller than said first width and also smaller than the width of said second opening in the outer band portion, said second reduced portion being formed by material removal forming cut-out means of a width in the longitudinal direction of the tab-like member greater than the thickness of said clamping band so that during tightening of the claim said tab-like member can slide with its second portion into the said second opening and engage with its cut-out means the edge portions of said second opening, thereby preventing re-opening of the connection during tightening of the clamp.

9. Clamp according to claim 8, wherein said tab-like member includes two cut-out means arranged substantially symmetrically with respect to the center longitudinal plane of said tab-like member.

10. Clamp according to claim 8, wherein said tab-like member extends outwardly at an angle with respect to the clamping band.

11. Clamp according to claim 8, wherein said tab-like member had a width smaller than the width of said clamping band and a thickness corresponding to the thickness of the clamping band.

12. Clamp according to claim 8, wherein said tab-like member extends outwardly substantially rectilinearly.

13. Clamp according to claim 8, wherein said tab-like member is of generally rectangular configuration having a width in the transverse direction smaller than the width of said clamping band and a thickness corresponding to the thickness of said clamping band.

14. Clamp according to claim 13, wherein said first opening is a slot-like opening in width and length thereof conforming substantially to the width and length of said tab-like member and being slightly larger than said tab-like member so that said tab-like member can just extend through said slot-like opening and said slot-like opening thereby defines the maximum diametric dimension with which said clamp can be used.

15. Clamp according to claim 14, wherein said slot-like member, said first and second openings and said first and second width of said tab-like member are arranged substantially symmetrically with respect to the center plane of the clamping band.

16. An open-type hose clamp according to claim 8, wherein said means is operable to lock up the mechanical connection during the entire tightening operation of the clamp.

17. An open-type hose clamp according to claim 8, wherein said cutout means are located in the area adjacent to the area containing the axis about which the hook member is bent out of the clamping band material.

18. An open-type hose clamp according to claim 17, wherein the width of said cutout means is at least about 1.15 times the thickness of the band material.

19. An open-type hose clamp according to claim 18, wherein the cutout means are provided in the two lateral areas of the hook member.

20. An open-type hose clamp according to claim 19, wherein the cutout means are of substantially the same depth leaving a hook member of reduced width.

21. An open-type hose clamp according to claim 20, wherein the reduced width portion of the hook member is at least about 50% of the width of the clamping band material.

22. An open-type hose clamp according to claim 21, wherein said reduced width portion is from about 50% to about 70% of the width of the clamping band material.

23. An open-type hose clamp according to claim 8, wherein the width of said cutout means is at least about 1.15 times the thickness of the band material.

24. An open-type hose clamp according to claim 8, wherein the cutout means are of substantially the same depth leaving a hook member of reduced width.

25. An open-type hose clamp according to claim 8, wherein the reduced width portion of the hook member is at least about 50% of the width of the clamping band material.

26. An open-type hose clamp according to claim 25, wherein said reduced width portion is from about 50% to about 70% of the width of the clamping band material.

* * * * *